(No Model.)

S. M. STEVENSON.
DIRT CART.

No. 366,043. Patented July 5, 1887.

WITNESSES:
Donn Twitchell
C. Sedgwick

INVENTOR:
S. M. Stevenson
BY Munn & Co.
ATTORNEYS.

(No Model.) 2 Sheets—Sheet 2.
S. M. STEVENSON.
DIRT CART.
No. 366,043. Patented July 5, 1887.
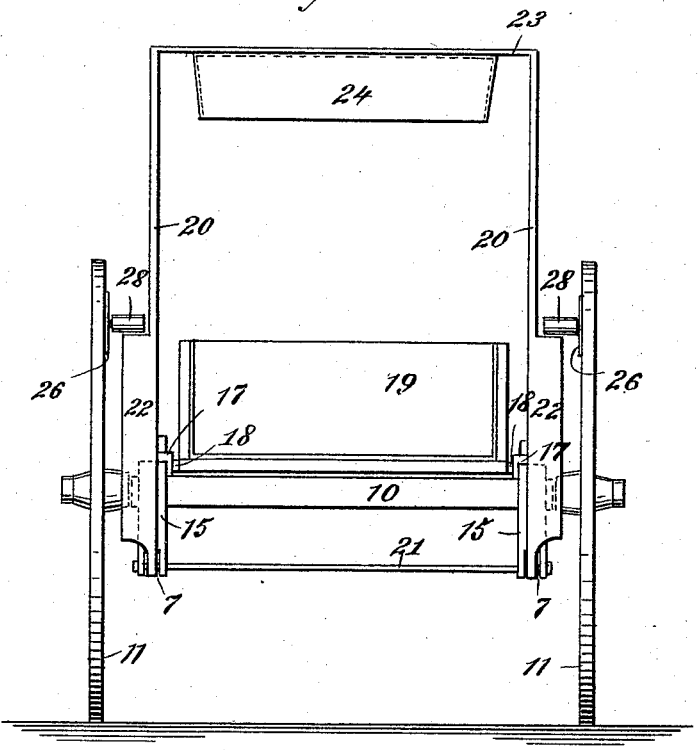
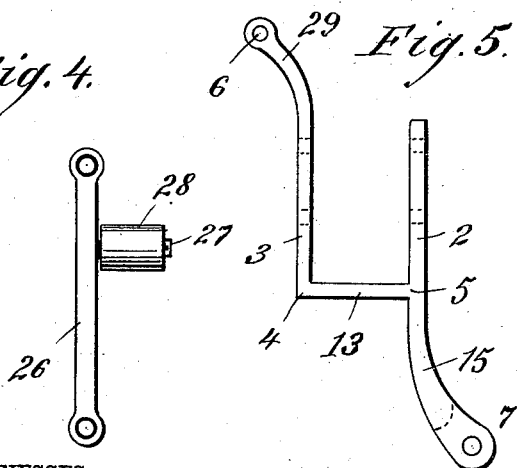
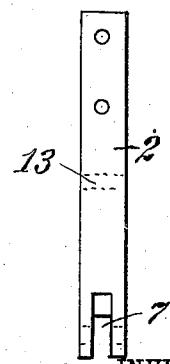
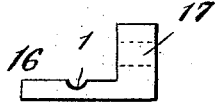
WITNESSES:
Donn Twitchell.
C. Sedgwick.
INVENTOR:
S. M. Stevenson
BY Munn & Co
ATTORNEYS.

UNITED STATES PATENT OFFICE.

SAMUEL MAHAN STEVENSON, OF BASTROP, LOUISIANA.

DIRT-CART.

SPECIFICATION forming part of Letters Patent No. 366,043, dated July 5, 1887.

Application filed November 6, 1886. Serial No. 218,157. (No model.)

*To all whom it may concern:*

Be it known that I, SAMUEL MAHAN STEVENSON, of Bastrop, in the parish of Morehouse and State of Louisiana, have invented a new and Improved Dirt-Cart, of which the following is a full, clear, and exact description.

This invention relates to dirt-carts, the object of the invention being to provide a self-loading cart that shall be automatic in its action, thereby providing for the loading and unloading of the cart without the necessity of employing a large gang of men, whereby I am enabled to move a given quantity of material much more rapidly and at the same time more economically than with the old form of dump-cart, which had to be loaded by hand.

To the end named the invention consists of a scoop or shovel rigidly connected to two rearwardly-extending levers that are pivotally connected to a clip that is secured to the axle, said levers being provided with outwardly-extending flanges which project within the path of roller-carrying pins that are secured to the spokes of the wheel, whereby when the wheels revolve so that the cart will move forward the roller-carrying pins will act to raise the levers, thus carrying the scoop up over the body of the cart to a position from which it will discharge its load.

The invention further consists of a novel cart-raising attachment, whereby the two wheels of a cart may be set to register, for a purpose to be hereinafter explained.

Reference is to be had to the accompanying drawings, forming a part of this specification, in which similar figures of reference indicate corresponding parts in all the views.

Figure 1:
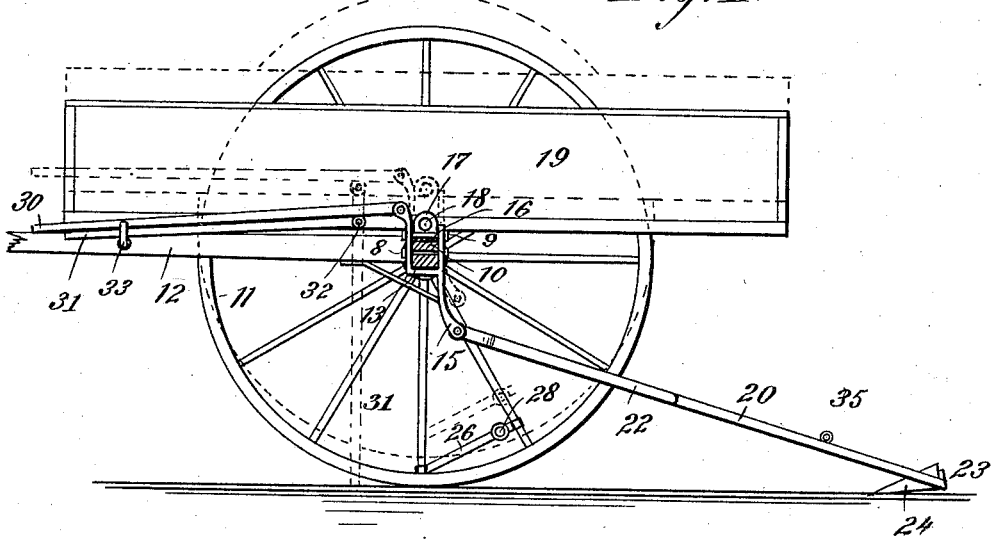
Figure 2:
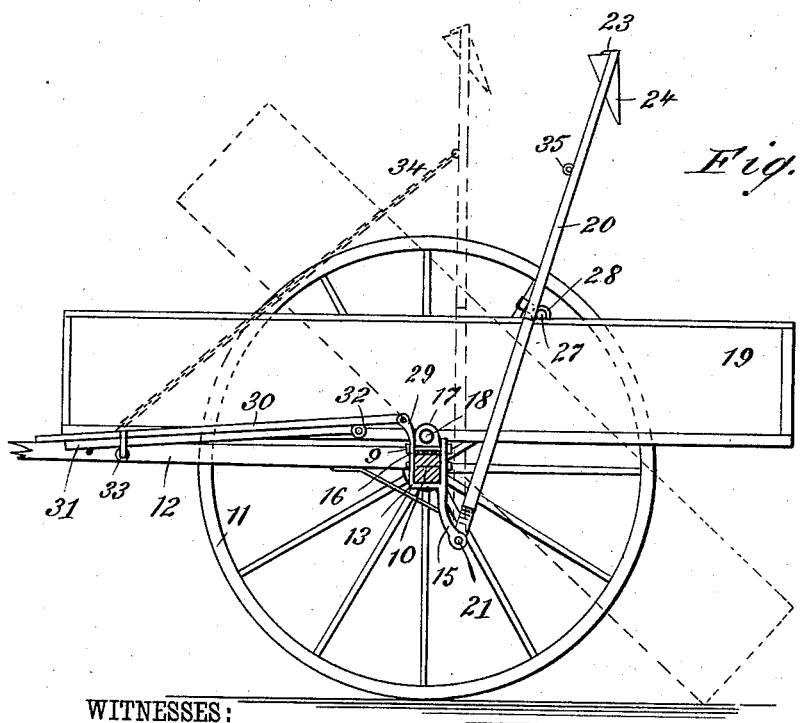

Figure 1 is a sectional side elevation of my improved form of dirt-cart, the left-hand wheel being removed and the axle being shown in section upon a line just within the wheel, the cart being shown in full lines as it appears when the scraper is adjusted to receive its load and in dotted lines as it appears when the cart has been raised in order to adjust the wheels to a proper register. Fig. 2 is a side view of the cart, wherein the axle is also shown in cross section, the parts being represented in full lines in the positions they assume when the load is being dumped from the scraper to the cart and in dotted lines as they appear when the load is being dumped from the cart-body. Fig. 3 is a rear view of the cart, the scraper and its supporting-levers being represented as they appear when adjusted so that the cart may be drawn from place to place; and Figs. 4, 5, 6, and 7 represent certain details of construction, the views being drawn upon an enlarged scale.

In the drawings, 10 represents the axle of the cart, to which the wheels 11 and the shafts 12 are connected in the ordinary well-known manner. Just within the wheels, and near each end of the axle 10, I secure clips 13, said clips being of novel form and construction. The clips 13 consist of two main parts, 2 and 3, the part 3 being bent at 4 and welded to the part 2 at 5, the upper end of the part 3 being bent forward to form an arm, 29, which is provided with an eye, 6, while the lower end of the part 2 extends downward and to the rear, this lower end constituting an arm, 15, which is formed with a slot, 7, and within this slot there is arranged the end of a lever, 20, as will be hereinafter described. The clips 13 are connected to the axle by bolts 8 and 9, the bolts 8 passing through apertures formed in the parts 2 and 3 and through apertures formed in the axle, while the bolts 9 pass through apertures formed in the parts 2 and 3 and over plates 16 that are placed upon the upper face of the axle, the bolts resting within recess 1, formed in the plates. These plates 16 are formed with upwardly-turned ears 17, that are centrally apertured to receive trunnions 18, that are secured to the sides of the cart-body 19, the arrangement being such that the cart-body is pivotally mounted upon its trunnions, which trunnions, as just stated, rest within apertures formed in the ears 17, the forward end of the cart-body being arranged to be secured to the shafts 12 in any of the well-known ways. The levers 20 are secured within the slots 7 by means of a long cross bolt or rod, 21, and upon the outer face of each lever there is formed an outwardly-extending flange, 22. The extending ends of the levers 20 are connected by a cross-bar, 23, to which there is riveted a scoop or shovel, 24. To two adjacent spokes of each of the wheels 11, I attach a rod, 26, said rods carrying inwardly-extending studs or pins 27, upon which there are mounted rollers 28. To the upwardly and forwardly extending ends 29 of the parts 3 of the clips 13, I connect levers 30, which levers carry rods or standards 31, said rods or standards 31 being pivotally connected to the levers, as clearly shown at 32. To each of the shafts 12, I secure a hook, 33, within which the levers 30 and their rods or standards 31 are placed when not required for use. To each shaft I also connect a chain, 34, each of which chains is arranged to be brought into engagement with an eye, 35, said eyes being carried by the levers 20.

Such being the general construction of the cart, the operation is as follows: The lever 20 and the scoop 24, carried thereby, having been adjusted to the position in which they are shown in full lines in Fig. 1, the levers 30 and the standards 31, carried thereby, are raised from engagement with the hooks 33, and the standards 31 are allowed to drop downward, so that their free ends will rest upon the ground, when, if the lever 30 is forced downward, one of the wheels of the cart will be raised from the ground, and may be turned to register with the other wheel—that is, may be turned so that the rollers 28 will be in the same line. The lever 30 and the standards 31 will then be returned to the position in which they are shown in full lines in Fig. 1, and the cart will be started forward, the scraper 24 resting upon the ground, as before stated, and as shown in Fig. 1. As the cart so moves forward the scraper will gather up a load of material, and when the rollers 28 strike against the flanges 22 the levers 20 will be raised and gradually carried to the position in which they are shown in full lines in Fig. 2, and as the levers so move to the position named the load gathered by the scraper will be dumped into the body of the cart; but just as the levers reach this position the rollers 28 will have passed beyond the upper edges of the flanges 22, owing to the fact that the levers are pivotally mounted below the axis of the cart-wheel, and as the rollers so pass from engagement with the flanges the levers and the scoop carried thereby will drop backward to the position in which the parts are shown in Fig. 1, there to gather a fresh load of material. After the cart-body has been loaded, the chains 34 are brought into engagement with the eyes 35, and the levers 20 and the scoop carried thereby are held in position shown in dotted lines in Fig. 2, after which the cart may be moved to the point where it is desired to deposit the load carried by the cart-body, which is delivered from the cart by dumping in the ordinary manner.

Having thus fully described my invention, I claim as new and desire to secure by Letters Patent—

1. The combination, with a cart, of pivotally-mounted levers formed with outwardly-extending flanges, a scoop or shovel carried by the levers, and rollers carried by the cart-wheels, substantially as described.

2. The combination, with a cart, of clips 13, connected to the axle of the cart and formed with downwardly-extending and slotted arms 15, levers 20, formed with flanges 22 and pivotally mounted within the slots of the arms 15, a scoop or shovel, 24, carried by the levers, and rollers 28, carried by the wheel, substantially as described.

3. The combination, with a cart, of levers 30, carrying standards 31, substantially as described.

4. The combination, with a cart, of clips 13, formed with upwardly and forwardly extending arms 29, levers 30, pivotally connected to said arms, bars or standards 31, pivotally connected to the levers, and hooks 33, carried by the shafts of the cart, substantially as described.

5. The combination, with a cart, of clips 13, formed with arms 15 and 29, connecting-bolts 8 and 9, plates 16, formed with ears or bosses 17, within which the trunnions of the cart-body ride, levers 20, pivotally connected to the arms 15, a scoop, 24, carried by the levers 20, flanges 22, formed upon said levers, rollers 28, carried by the wheels, and levers 30, having standards 31, said levers being pivotally connected to the arms 29 of the clips 13, substantially as described.

6. The combination, with a cart the wheels of which have laterally-extending projections, of the levers pivotally connected with the cart in the path of the said projections and having a scoop at their outer ends, substantially as set forth.

SAMUEL MAHAN STEVENSON.

Witnesses:
G. W. NOFF,
R. W. WATSON.